United States Patent
Lewis

(10) Patent No.: US 8,180,302 B2
(45) Date of Patent: May 15, 2012

(54) POLAR MODULATOR WITH SIGNED AMPLITUDE REDUCING PHASE TRANSITIONS

(75) Inventor: Michael Lewis, Marsta (SE)

(73) Assignee: Intel Mobile Communications GmbH, Neubiberg (DE)

(*) Notice: Subject to any disclaimer, the term of this patent is extended or adjusted under 35 U.S.C. 154(b) by 0 days.

(21) Appl. No.: 13/085,501

(22) Filed: Apr. 13, 2011

(65) Prior Publication Data

US 2011/0182373 A1 Jul. 28, 2011

Related U.S. Application Data

(62) Division of application No. 11/675,002, filed on Feb. 14, 2007, now Pat. No. 7,945,223.

(51) Int. Cl.
*H04B 1/38* (2006.01)

(52) U.S. Cl. ....... 455/73; 455/108; 455/126; 455/127.4; 375/300

(58) Field of Classification Search .................... 455/73, 455/75, 78, 102, 108, 110, 126, 127.1, 127.4, 455/127.5, 205; 375/297, 300
See application file for complete search history.

(56) References Cited

U.S. PATENT DOCUMENTS

| | | | | |
|---|---|---|---|---|
| 5,844,934 A | * | 12/1998 | Lund | 375/145 |
| 6,246,729 B1 | * | 6/2001 | Richardson | 375/324 |
| 7,023,900 B2 | * | 4/2006 | Cleveland | 375/146 |
| 7,386,058 B2 | * | 6/2008 | Fujii | 375/267 |
| 7,403,750 B2 | * | 7/2008 | Rosnell et al. | 455/127.4 |

OTHER PUBLICATIONS

Prosecution History, U.S. Appl. No. 11/675,002, filed Feb. 14, 2007, to include Jun. 23, 2010 Non-Final Rejection, Dec. 16, 2009 Non-Final Rejection, Jun. 23, 2010 List of references cited by examiner, Dec. 16, 2009 List of references cited by examiner, Dec. 16, 2009 List of References cited by applicant and considered by examiner, and Sep. 15, 2008 Information Disclosure Statement (IDS) Filed (SB/08).

* cited by examiner

*Primary Examiner* — Nhan Le
(74) *Attorney, Agent, or Firm* — SpryIP, LLC

(57) ABSTRACT

A polar modulator including a signal converter configured to provide a phase signal and an amplitude signal based on at least one received signal is disclosed. A digital-to-analog converter is coupled to the signal converter, the digital-to-analog converter configured to receive an augmented signal, wherein a polarity of the augmented signal is selected to minimize an absolute phase change for sequential signals. A signal mixer is coupled to the digital-to-analog converter to receive an analog signal generated from the augmented signal.

11 Claims, 2 Drawing Sheets

POLAR MODULATOR WITH SIGNED AMPLITUDE REDUCING PHASE TRANSITIONS

RELATED APPLICATIONS

This Application is a Divisional Application of co-pending U.S. patent application Ser. No. 11/675,002, which was filed on Feb. 14, 2007. The entire contents of the co-pending Application are hereby incorporated herein by reference.

TECHNICAL FIELD

The various embodiments described herein relate generally to signal processing circuits, including polar modulators.

BACKGROUND

There are currently about two billion subscribers of wireless products worldwide, and the demand for access to information and new services continues to increase. In order to meet demand, handset terminals have to grow in sophistication and capability. This can lead to increasingly complex circuitry and power consumption, which can result in larger, heavier and more expensive handset terminals. Further, the various mobile communication standards used in different geographic regions and countries can prevent a wireless subscriber from using the same handset terminal in many locations. Adoption of a single communications standard is unlikely because of the associated infrastructure costs. A multi-mode handset terminal may provide a solution to such interoperability. A common circuit architecture can make the integration of multiple modulation schemes and interface standards possible. Such convergence technology is also relevant to base stations that function with the multi-mode handset terminal. Therefore, there is a general need for common circuit architecture with reduced complexity and power consumption.

DETAILED DESCRIPTION

Figure 1:
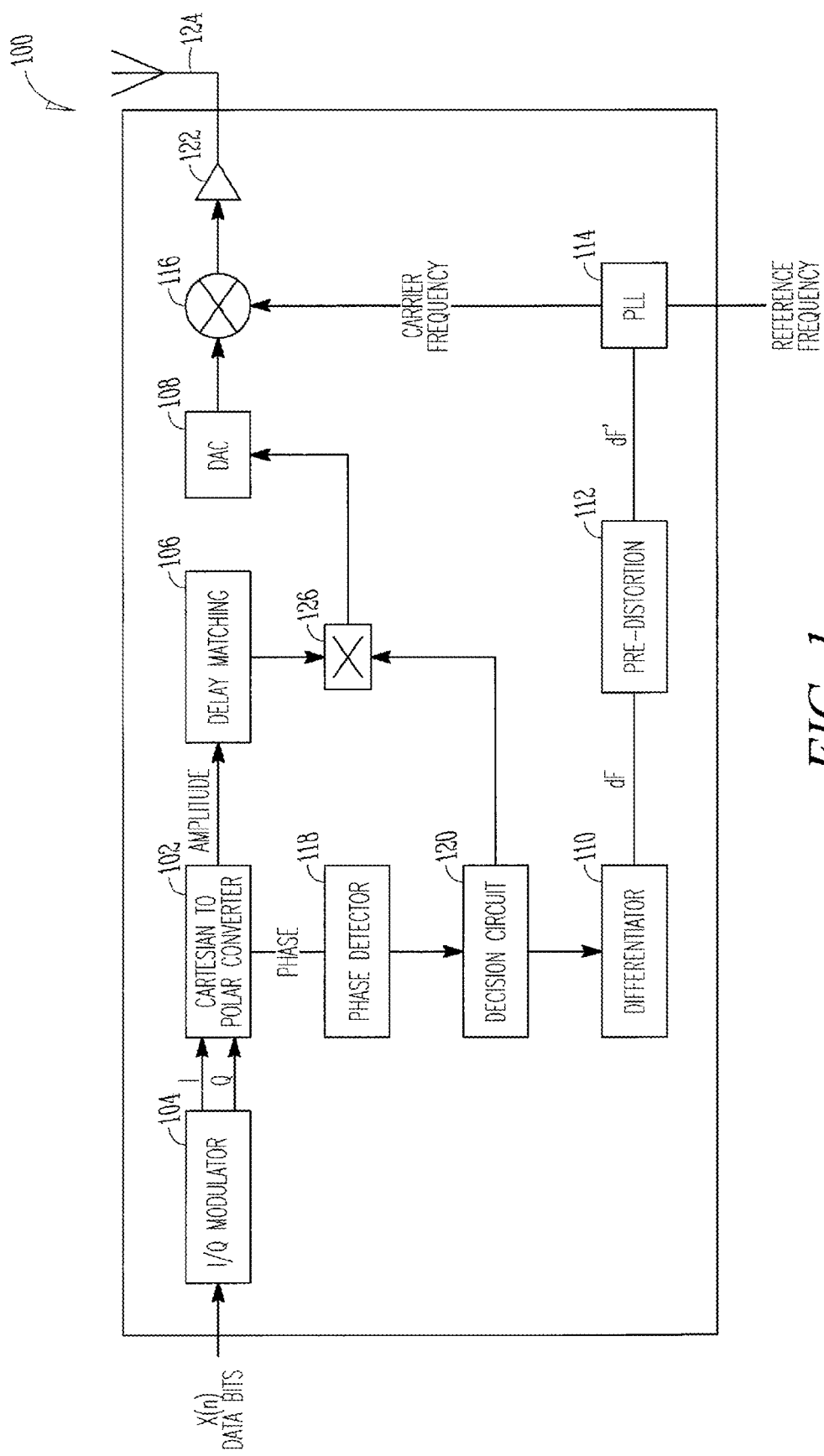
FIG. 1 is a simplified schematic diagram illustrating a polar modulator according to various embodiments of the invention.

The following detailed description refers to the accompanying drawings that show, by way of illustration, specific details and embodiments in which the invention may be practiced. These embodiments, which are also referred to herein as "examples," are described in sufficient detail to enable those skilled in the art to practice the invention. The various embodiments are not necessarily mutually exclusive, as some embodiments can be combined with one or more other embodiments to form new embodiments. The scope of the invention should, therefore, be determined with reference to the appended claims, along with the full scope of equivalents to which such claims are entitled.

Various modulation schemes in use for digital communications are incompatible. The typical portable communications device, such as a cell phone or a personal digital assistant (PDA), may only be usable with one communications protocol. A polar modulator is a circuit architecture that can be adapted for use in portable devices and base stations using different signal formats, such a Groupe Spécial Mobile (GSM), Wideband Code Division Multiple Access (CDMA), General Packet Radio Service (GPRS), Enhanced Data rates for GSM Evolution (EDGE), and others. Because the polar modulator can be configured to be generic to the various transmission protocols in use, it can be useful for reducing transmitter complexity.

For example, the polar modulator eliminates the need to generate separate carrier signals for the in-phase (I) and quadrature (Q) signals output from an I/Q modulator, and eliminates image rejection problems associated with heterodyning the I and Q signals. The polar modulator can also operate at lower currents thereby reducing transmitter power consumption and, in the case of a handset terminal like a cell phone, increase the talk time. The polar modulator can also make frequency synthesis more robust by allowing the VCO to operate at the same frequency as, or a multiple of, the baseband carrier frequency. A further benefit may be obtained with the polar modulator at the integrated circuit processing level. Since the polar modulator can be manufactured using advanced digital circuit processing technologies, such as used in the fabrication of complementary metal oxide semiconductors (CMOS) devices, the complexities associated with analog fabrication are removed.

Although the polar modulator can offer the advantages described above, the use of the polar modulator in communications systems may be limited by design trade-offs between the phase lock loop (PLL) predistortion circuitry and the I/Q modulator. Such design trade-offs include trade-offs in PLL bandwidth, spectral mask and error vector magnitude. In particular, frequency deviations for the I and Q signals output from the I/Q modulator that are translated through to the Cartesian-to-polar converter can be amplified by predistortion circuitry coupled to the PLL. If the PLL slew rate control is unable to match the rate change in the differential frequency signal received from the predistortion circuit, then the accumulated phase will lag that required to maintain a stable baseband carrier frequency. Such a phase lag can generate an error vector in the transmitted signal. As will be appreciated, the trade-offs can be reduced by limiting the maximum phase change of the sampled signal as described herein.

FIG. 1 is a simplified schematic diagram illustrating a polar modulator according to various embodiments of the invention. In this example, the polar modulator 100 includes a Cartesian-to-polar converter 102 configured to receive an in-phase signal, I, and a quadrature signal, Q, transmitted from I/Q modulator 104. The I and Q signals are generated by the I/Q modulator from the received data signals using oscillator circuitry (not shown), as is well know to one of ordinary skill in the art. A time delay matching circuit 106 is coupled to the Cartesian-to-polar converter 102 to receive an amplitude signal formed from the I and Q signals provided by the I/Q modulator 104. The time delay circuit 106 is adapted to transmit a delayed amplitude signal to the signal multiplier 126. The time delay circuit 106 can also be configured to provide a negative delay, to in effect time-advance the amplitude signal transmitted to the signal multiplier 126. The signal multiplier 126 is configured to transmit a signal product to the digital-to-analog converter (DAC) 108. The output of the DAC 108 provides an analog representation of an amplitude signal product to the radio frequency signal mixer 116. The DAC 108 and the radio frequency signal mixer 116 are each configured to process a signed amplitude signal product as will be later described. The signal mixer 116 is further configured to receive a carrier signal transmitted from the PLL 114 and to provide a frequency up-converted signal to amplifier 122. Amplifier 122 can be formed by coupling one or more amplifiers with different gains and noise properties, and may include a low noise amplification stage.

The Cartesian-to-polar converter 102 is further coupled to a phase detector 118 that is configured to receive phase information associated with the I and Q signals. The phase detector 118 is coupled to a decision circuit 120. The phase detector 118 is configured to provide a phase related signal to the decision circuit 120 that is based on the phase information provided by the Cartesian-to-polar converter 102. Although the phase detector 118 and decision circuit 120 are illustrated here as being separate circuit blocks for purpose of clarity, detector 118 and circuit 120 can be formed as a single unit or circuit.

The decision circuit 120 is coupled to the multiplier 126 and to a differentiator 110. The decision circuit 120 is configured to generate a signed amplitude signal for transmission to the signal multiplier 126 for use in forming a signal product incorporating the delayed amplitude signal output from the delay matching circuit 106. The decision circuit 120 also transmits a signal to the phase differentiator 110 that is based on the phase related signal received from the phase detector 118. In general, the signal transmitted from the decision circuit 120 to the phase differentiator 110 corresponds to the phase for sequential signals. The phase differentiator 110 is coupled to the pre-distortion circuit 112 to provide a differential frequency signal (dF) to the pre-distortion circuit 112. The differential frequency signal received by the pre-distortion circuit 112 is proportional to the derivative phase of the sequential signal output from the decision circuit 120. The differential signal (dF) is further processed by the pre-distortion circuit 112 and transmitted to the PLL 114 as an amplified differential frequency signal (dF') adapted to compensate for a distortion characteristic of the PLL 114, such as a reduced response amplitude at high frequencies introduced by the transfer function of the PLL 114. The PLL 114 can be any suitable type PLL as is known to one of ordinary skill in the art.

A delay can be introduced for the amplitude signal output from the Cartesian-to-polar converter 102. The time delay matching circuit 106 is adjusted such that the separate delays for the amplitude signal output from the Cartesian-to-polar converter 102 and the differential frequency signal (dF') associated with the phase component path are substantially equal.

The heterodyne signal provided by the signal mixer 116 to the amplifier 122 can be coupled to an antenna 124, or other such device, for transmission and subsequent reception.

Referring to FIG. 1, sequentially sampled data signals X(n) are input to the I/Q modulator 104 and separated into sampled I and Q signal components represented as real and imaginary parts, I(n) and Q(n), respectively, such that the sampled data signals X(n) can have the relationship, $$X(n)=I(n)+jQ(n).$$

The Cartesian-to-polar converter 102 converts the I(n) and Q(n) signals received from the I/Q modulator 104 to a polar signal representation having an output form given by $$X(n)=R(n)\cdot(\cos\theta(n)+j\sin\theta(n)),$$

where R(n) is the unsigned sampled signal amplitude and θ(n) is the sampled phase for the sequentially sampled signals ranging from $-\pi$ to $+\pi$ output from the Cartesian-to-polar converter 102. A time shifted replica of R(n) is transmitted to the multiplier 126 where it is multiplied with a signed signal amplitude s(n) received from the decisions circuit 120. The resulting signal product forms an augmented amplitude signal that can be represented by, $$X(n)=s(n)\cdot R(n)\cdot(\cos\theta'(n)+j\sin\theta'(n)),$$

where s(n) has a value of either $-1$ or $1$ corresponding to the change in phase in the signal component sensed by the phase detector 118.

The phase component, θ(n), is transmitted by the phase detector 118 that is configured to monitor θ(n) for instances where the phase change of sequential signal, θ(n)−θ(n−1), exceeds either $-\pi/2$ or $+\pi/2$. For a phase change for sequential signals ranging less than or equal to $-\pi/2$ to $+\pi/2$, the decision circuit 120 transmits a signal s(n)=1 to multiplier 126, and the θ(n) received from the Cartesian-to-polar converter 102 is transmitted unchanged as θ'(n)=θ(n) through to the differentiator 110 for processing in the manner described above. For a sensed phase change for sequential signal exceeding either $-\pi/2$ or $+\pi/2$, the decision circuit 120 transmits a signal s(n)=−1 to the multiplier 106, and the phase component received from the Cartesian-to-polar converter 102 is not transmitted through to the differentiator 110, but rather, a signal corresponding to an unwrapped phase of θ'(n)=θ(n)+π is transmitted for processing in the manner described above. The absolute phase change for sequential signals |θ(n)−θ(n−1)| output from the Cartesian-to-polar converter 102 is therefore limited to a value ranging from between 0 and π/2, and the augmented signal is an amplitude signal product having a bipolar amplitude of −R(n) or R(n), depending on the phase as described.

The augmented signal, −R(n) or R(n), is transmitted to the DAC 108 which is configured to convert the augmented signal to a related analog formatted signal for transmission to the signal mixer 116. The signal mixer 116 is configured to accept the augmented signal in analog format for carrier based transmission enabling later reception and demodulation using a heterodyne receiver.

Figure 2:
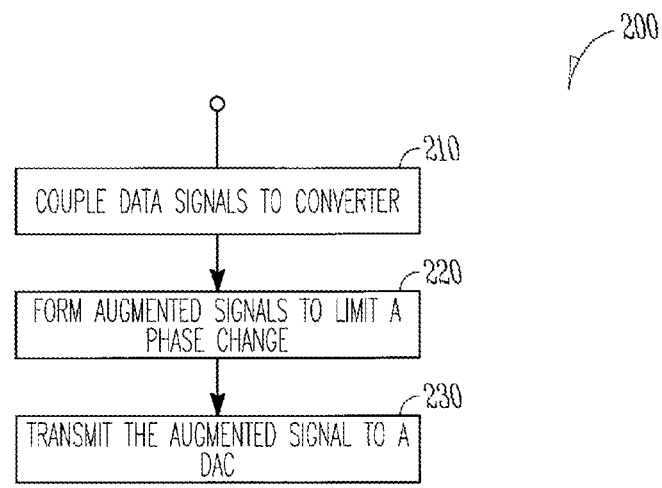
FIG. 2 is a flow chart of illustrating a method of using a polar modulator according to various embodiments of the invention.

FIG. 2 is a flow chart illustrating a method of using a polar modulator according to various embodiments of the invention. Method 200 begins at block 210 by coupling data signals to a converter, such as a Cartesian-to-polar converter. The converter can be adapted to for use in a handset terminal, such as a cell phone or a PDA, or a base station configured to communicate with a handset terminal. In various embodiments, the converter is coupled to an I/Q modulator configured to receive sequentially sampled data signals and to further provide signals in quadrature that are based on the received sequentially sampled data signals. The Cartesian-to-polar converter is configured to provide an unsigned amplitude component and a phase component as a polar format representation of sequentially sampled data signals. The unsigned amplitude component is formed from the real and imaginary parts of a complex signal representation associated with the sequentially sampled data signals. In various embodiments, the unsigned amplitude component is shifted in time using a timing circuit configured to match a propagation time for co-generated signals transmitted between two common circuit locations having different signal path lengths.

At block 220, the phase component associated with the sequentially sampled data signals provided by the signal converter is used for forming augmented signals. In some embodiments, the phase component is transmitted to a circuit, such as a decision circuit that includes a phase detector, configured to sense phase information and to generate a signed amplitude signal based on a sensed phase change. In some embodiments, the decision circuit and the phase detector are separate circuits coupled to generate the signed amplitude signal.

In various embodiments, the decision circuit generates a signed amplitude component to limit an absolute phase change for sequential signals that vary from about $-\pi$ to $\pi$ to about $-\pi/2$ to $\pi/2$. In some embodiments, a signed amplitude signal is generated with a value of $-1$ or $1$. The signed amplitude signal can be transmitted to a signal multiplier and combined with the unsigned amplitude component, $R(n)$, to form a signal product having a bipolar signal amplitude of $-R(n)$ or $R(n)$. In some embodiments, the bipolar signal amplitude signal is formed from an unsigned amplitude signal shifted in time to match a circuit path length associated with the phase component. The phase component can be converted to a differential frequency component and transmitted to a PLL for controlling a carrier frequency used for up-converting an analog representation of the augmented signal.

At block 230, the augmented signal, formed as a product of the unsigned amplitude component output from the Cartesian-to-polar converter and the signed amplitude signal transmitted by the decision circuit, is transmitted to a DAC. The DAC is coupled to receive the augmented signal in a binary format and configured to process a signed amplitude signal product. The augmented signal is converted by the DAC to an equivalent signal in an analog format. The analog signal is output from the DAC to a signal mixer configured to receive a carrier signal from the PLL for transmission as a frequency up-converted signal with a reduce error vector component. The carrier signal can be a base band carrier signal with a frequency suitable to broadcast transmission or an intermediate carrier with an intermediate frequency suitable for further processing.

Figure 3:
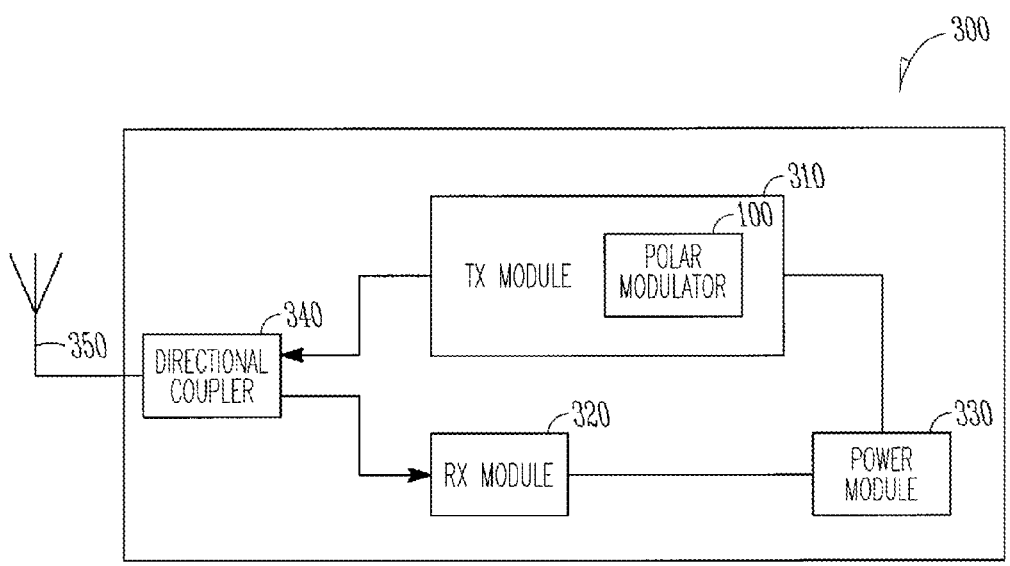
FIG. 3 is a simplified block diagram illustrating a system according to various embodiments of the invention.

FIG. 3 is a simplified block diagram illustrating a system according to various embodiments of the invention. In this example, system 300 includes a transmitter module 310 and a receiver module 320 coupled to a power module 330. Examples of a system 300 include a handset terminal, such as a cell phone or a PDA, and a base station configured to communicate with a wireless device, an optical network device and/or a device adapted to transmit data signals using a conductor, such as a coaxial cable, a stripline conductor and a twisted pair. The transmitter module 310 includes the polar modulator 100, as illustrated in FIG. 1. The receiver module can include circuitry and software to demodulate and decode the received data signals. The transmitter module 310 and the receiver module 320 can be coupled to a directional coupler 340 configured to transmit and receive signals using the electromagnetic wave device 350. Electromagnetic wave device 350 can be an antenna or other structure capable of relaying data signal between a transmission medium and the system 300. The directional coupler 340 can be a duplexer, a circulator or other suitable device capable of frequency filtering and/or directing electromagnetic signals as is known to one of ordinary skill in the art. The power module can be any suitable power source that can be accommodated by the system 300. Examples of a power module include a battery and an AC to DC converter.

It should be understood that system 300 is not intended to be illustrative of a complete system, but is shown with only certain features for the purpose of clarity. For example, system 300 may include more than one transmitter module 310 and/or receiver module 320, more than one power module, a memory, an interface device, such as a speaker, a touchpad and a video display unit, and the associated driver circuitry and driver software.

The above Detailed Description is intended to be illustrative, and not restrictive. For example, the above-described embodiments (and/or aspects thereof) embodiments may be combined, utilized and derived therefrom, such that structural and logical substitutions and changes may be made without departing from the scope of this disclosure. Such embodiments of the inventive subject matter may be referred to herein, individually and/or collectively, by the term "invention" merely for convenience and without intending to voluntarily limit the scope of this application to any single invention or inventive concept if more than one is in fact disclosed. Many other embodiments will be apparent to those of skill in the art upon reviewing the above description.

The methods described herein do not have to be executed in the order described, or in any particular order, unless it is otherwise specified that a particular order is required. Moreover, unless otherwise specified, various activities described with respect to the methods identified herein can be executed in repetitive, simultaneous, serial, or parallel fashion.

The terms "a" or "an" are used, as is common in patent documents, to include one or more than one. The term "or" is used to refer to a nonexclusive or, unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim.

In this document, a "Cartesian to polar converter" refers generally to a device capable of converting a signal representation presented in a two dimensional rectangular coordinate system format to a signal representation having a two dimensional circular coordinate system format, as well known to one skilled in the art.

In the Detailed Description, methods and structures are described for applying a signed amplitude signal to a modulated signal to minimize changes in the accompanying phase transitions. In one embodiment, a polar modulator includes a signal converter configured to provide a phase signal and an amplitude signal based on at least one received signal. The polar modulator includes a digital-to-analog converter coupled to the signal converter. The digital-to-analog converter is configured to receive an augmented signal, wherein a polarity of the augmented signal is selected to minimize an absolute phase change for sequential signals. The polar modulator further includes a radio frequency mixer coupled to the digital-to-analog converter to receive an analog signal generated from the augmented signal.

In one embodiment, a method includes coupling data signals to a converter comprising a Cartesian-to-polar converter. The method includes forming augmented signals to limit an absolute phase change of sequential signal using the data signals. The augmented signals are based on a phase of the data signals. The method also includes transmitting the augmented signal to a digital-to-analog converter.

In one embodiment, a system includes a transmitter that includes a polar modulator. The polar modulator includes a signal converter configured to provide a phase signal and an amplitude signal based on a received signal. The polar modulator also includes a digital-to-analog converter coupled to the signal converter. The digital-to-analog converter is configured to receive an augmented signal, wherein a polarity of the augmented signal is selected to minimize an absolute phase change for sequential signals. The digital-to-analog converter is further configured to provide an analog signal to a signal mixer using the augmented signal. The transmitter also includes a power module configured to provide power to the transmitter.

The Abstract of the Disclosure is provided to comply with 37 C. F. R. §1.72(b), requiring the abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:
   a transmitter including a polar modulator, the polar modulator comprising:
      a signal converter configured to provide a phase signal and an amplitude signal based on a received signal; and
      a digital-to-analog converter coupled to the signal converter, the digital-to-analog converter configured to receive an augmented signal, wherein a polarity of the augmented signal is selected to minimize an absolute phase change for sequential signals, and wherein the digital-to-analog converter is configured to provide an analog signal to a signal mixer using the augmented signal; and
   a power module configured to provide power to the transmitter.

2. The transmitter of claim 1, wherein the signal converter includes a Cartesian to polar converter.

3. The transmitter of claim 1, wherein the polar modulator is adapted to provide a signal to an antenna associated with at least one of a handset terminal and a base station.

4. The transmitter of claim 1, wherein the absolute phase change is from about 0 to about $\pi/2$.

5. The transmitter of claim 1, wherein the signal converter, a decision circuit and a multiplier are configured to provide an output signal having the form $s(n) \cdot R(n)$, wherein $s(n)$ is either $-1$ or $1$, and wherein $R(n)$ is an amplitude component of a Cartesian representation of a signal received from an I/Q modulator.

6. The transmitter of claim 1, wherein the signal converter is configured to provide the augmented signal.

7. The transmitter of claim 1, wherein the augmented signal is selected to limit the absolute phase change to a maximum of about half the phase signal.

8. The transmitter of claim 1, wherein the absolute phase change is from about 0 to about $\pi/2$.

9. The transmitter of claim 1, wherein the amplitude signal includes the real part of a complex signal received from an I/Q modulator.

10. The transmitter of claim 1, wherein the signal converter includes an I/Q modulator.

11. The transmitter of claim 1, wherein the amplitude signal includes the imaginary part of a complex signal received from an I/Q modulator.

* * * * *